United States Patent [19]

Aiello et al.

[11] 3,753,492

[45] Aug. 21, 1973

[54] SEPARATING APPARATUS

[76] Inventors: Victor S. Aiello, Glen Cove; Joseph P. Albanese, Long Island City; Robert V. Anderson, Huntington; Frank Platt, Brooklyn, all of N.Y.

[22] Filed: June 19, 1970

[21] Appl. No.: 47,778

[52] U.S. Cl.................. 210/96, 210/242, 210/512, 210/DIG. 21
[51] Int. Cl............................................. C02c 1/38
[58] Field of Search................ 210/83.84, 304, 512, 210/242, 208, 219

[56] References Cited
UNITED STATES PATENTS

| | | | |
|---|---|---|---|
| 3,215,272 | 11/1965 | Sweeney | 210/512 X |
| 3,348,690 | 10/1967 | Cornelissen | 210/242 |
| 3,358,838 | 12/1967 | Kosar et al | 210/242 X |
| 2,876,903 | 3/1959 | Lee | 210/242 |
| 3,635,342 | 1/1972 | Mourlon et al | 210/84 |

OTHER PUBLICATIONS

"Sucking Oil from the Sea", Financial Times, April 6, 1970.

*Primary Examiner*—Frank A. Spear, Jr.
*Attorney*—Lester W. Clark, Robert S. Dunham, P. E. Henninger, Thomas F. Moran, Gerald W. Griffin, R. Bradlee Boal, Christopher C. Dunham and Robert Scobey

[57] ABSTRACT

Apparatus for separating two non-miscible liquids of different densities from a mixture thereof, including a vertical cylindrical tank with an inlet at one side and an outlet at the opposite side. External means produces a flow of the mixture into the inlet and of the heavier liquid through the outlet. The tank extends above and below the liquid-air interface to provide a free liquid surface inside the tank. A rotating impeller at the center of the bottom of the tank swirls the liquid in the tank and creates a vortex. The lighter liquid collects in a thick layer at the center of the vortex and is substantially absent from the periphery of the vortex. The lateral outlet carries away the heavier liquid. An outlet for the lighter liquid has an opening submerged in the liquid at the center of the vortex. A pump removes the lighter liquid through this outlet.

The separating apparatus may be mounted on a twin hulled vessel and propelled through the water, for the purpose of removing an oil slick from the surface. The inlet for the oil and water mixture is at the bow end of the tank, with the water outlet at the stern end. The oil outlet is provided with a pump for transferring the oil into suitable storage tanks, which may be in the hull or in separate vessels. Means are provided for coordinating the operation of the impeller and the oil pump.

9 Claims, 8 Drawing Figures

3,753,492

INVENTORS
VICTOR S. AIELLO
JOSEPH P. ALBANESE
ROBERT V. ANDERSON
FRANK PLATT
BY Lester N. Clark
ATTORNEY Fig. 5.
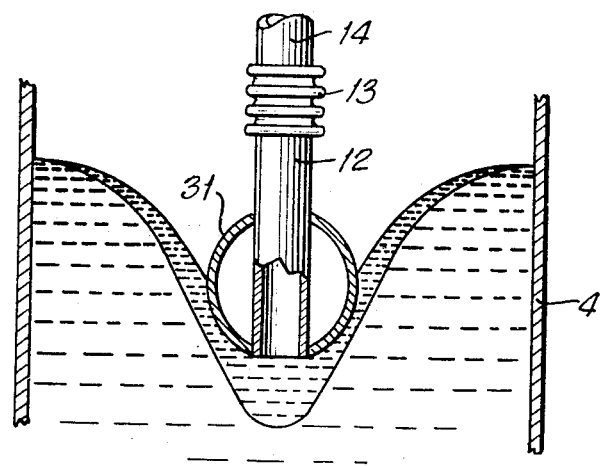
Fig. 7.
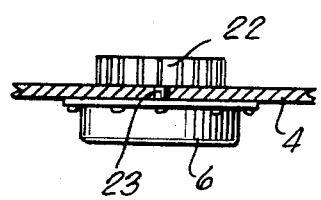
Fig. 6.
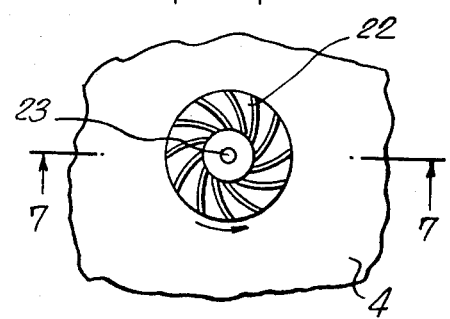
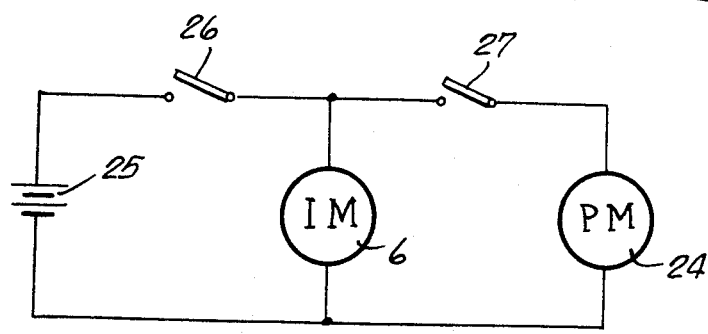
Fig. 8.

SEPARATING APPARATUS

BACKGROUND OF THE INVENTION

Many devices have been proposed for separating mixtures of two liquids, such as oil and water. Many of the proposed devices have been particularly intended for removing oil slicks from the surface of the open sea. The apparatus shown in the Patent to Cornelissen, No. 3,348,690 is typical. It comprises a barge having a pair of laterally extending skimming booms which extend above and below the surface of the water and guide the oil slick into intakes at the sides of the barge. The liquid received through the intake is pumped into settling tanks inside the barge, where a final separation of the oil and water takes place. The oil is pumped out of the settling tanks to storage tanks. The water is discharged back into the sea.

BRIEF SUMMARY OF THE INVENTION

According to the present invention, the separation of the oil and water is completed before the oil is pumped into the pick-up system. This separation is accomplished by directing the water with a layer of oil floating on it into a vertical cylindrical tank extending above and below the liquid surface. At the bottom of the tank, an impeller maintains the liquid in the tank in rotation about a vertical axis, so as to create a vortex substantially at the center of the liquid-air interface. The oil appears in this vortex as a layer of maximum thickness at the center, and decreasing to substantially zero thickness at the periphery.

A float having a contour symmetrical about a vertical axis is located in the tank and centers itself in the vortex. The float carries an outlet pipe for the oil whose open lower end is submerged in the liquid at the center of the vortex. The outlet pipe section carried by the float is preferably rigid, but the top of it connects to a flexible pipe section which may move laterally by a limited amount so as to allow the float to follow lateral movements of the vortex. The pipe is also vertically extendable, so as to accommodate changes in the liquid level with respect to the sides of the tank, such as may be occasioned by the filling of the storage tanks in the hull of the vessel.

DRAWINGS

FIG. 5 is a fragmentary view, similar to the central portion of FIG. 4, showing a modified form of float.

FIG. 6 is a plan view of the bottom of the separator tank, showing a modified form of impeller.

FIG. 7 is a sectional view on the line 7—7 of FIG. 6.

FIG. 8 is an electrical wiring diagram showing a circuit for energizing the impeller motor and the pump motor.

DETAILED DESCRIPTION

Figure 1:
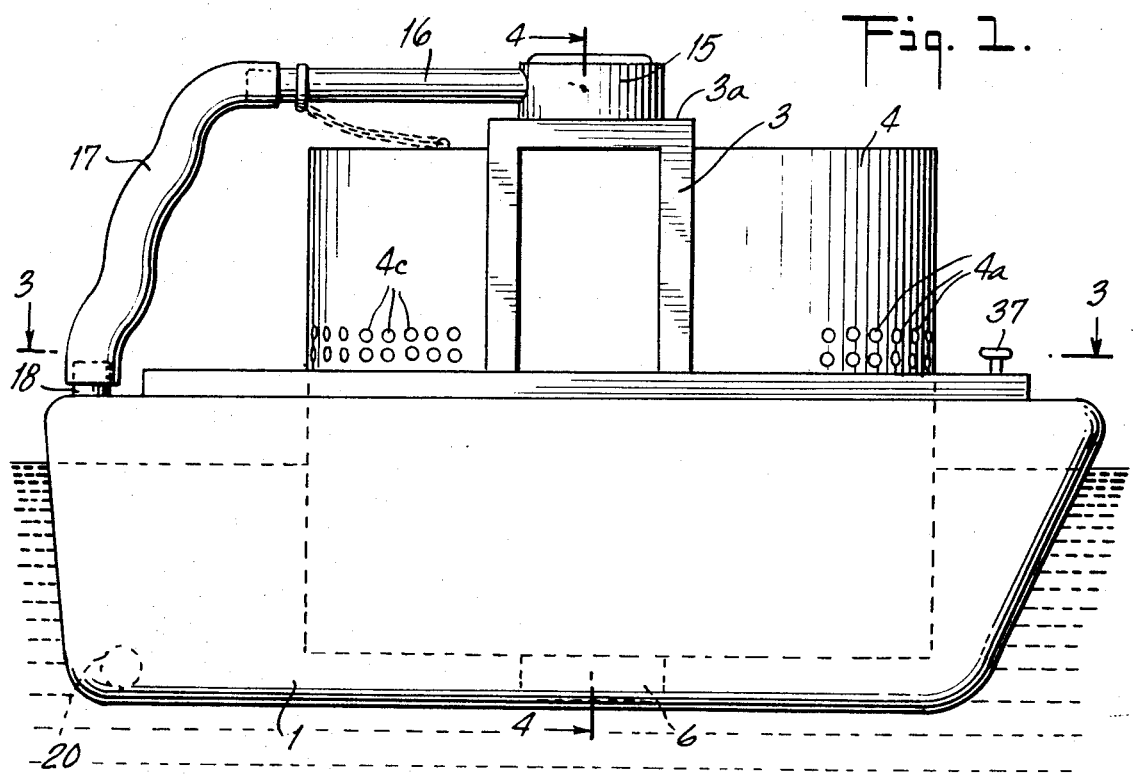
FIG. 1 is a starboard elevation of a vessel carrying a separating apparatus in accordance with the invention.
Figure 2:
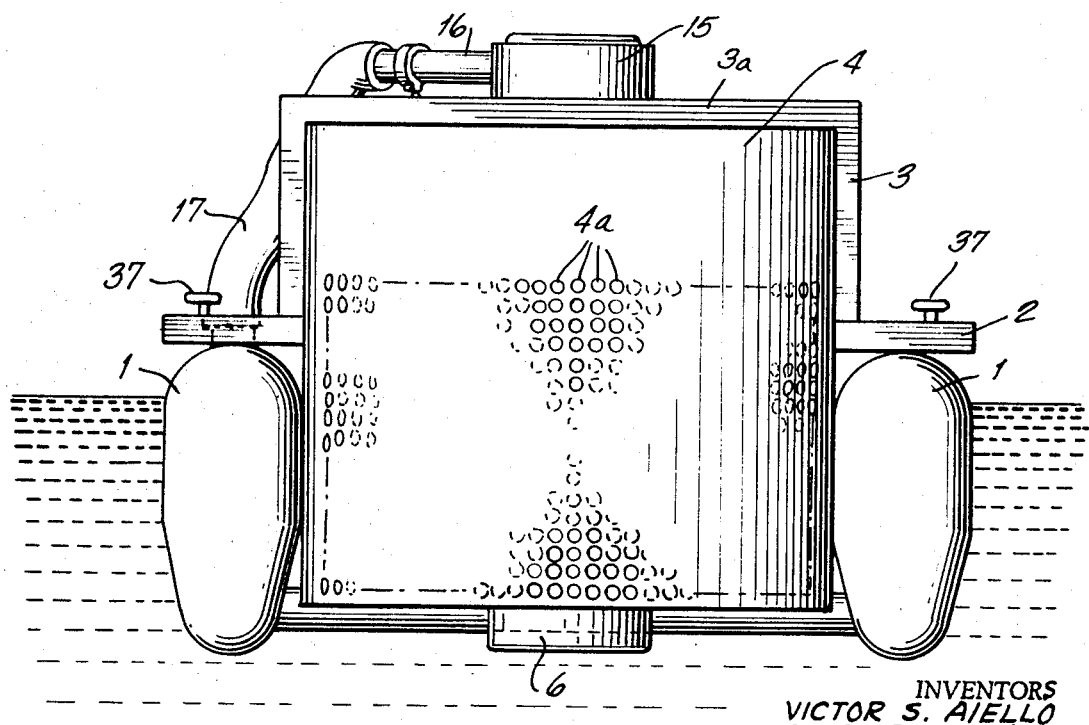
FIG. 2 is a bow elevation of the vessel of FIG. 1.
Figure 3:
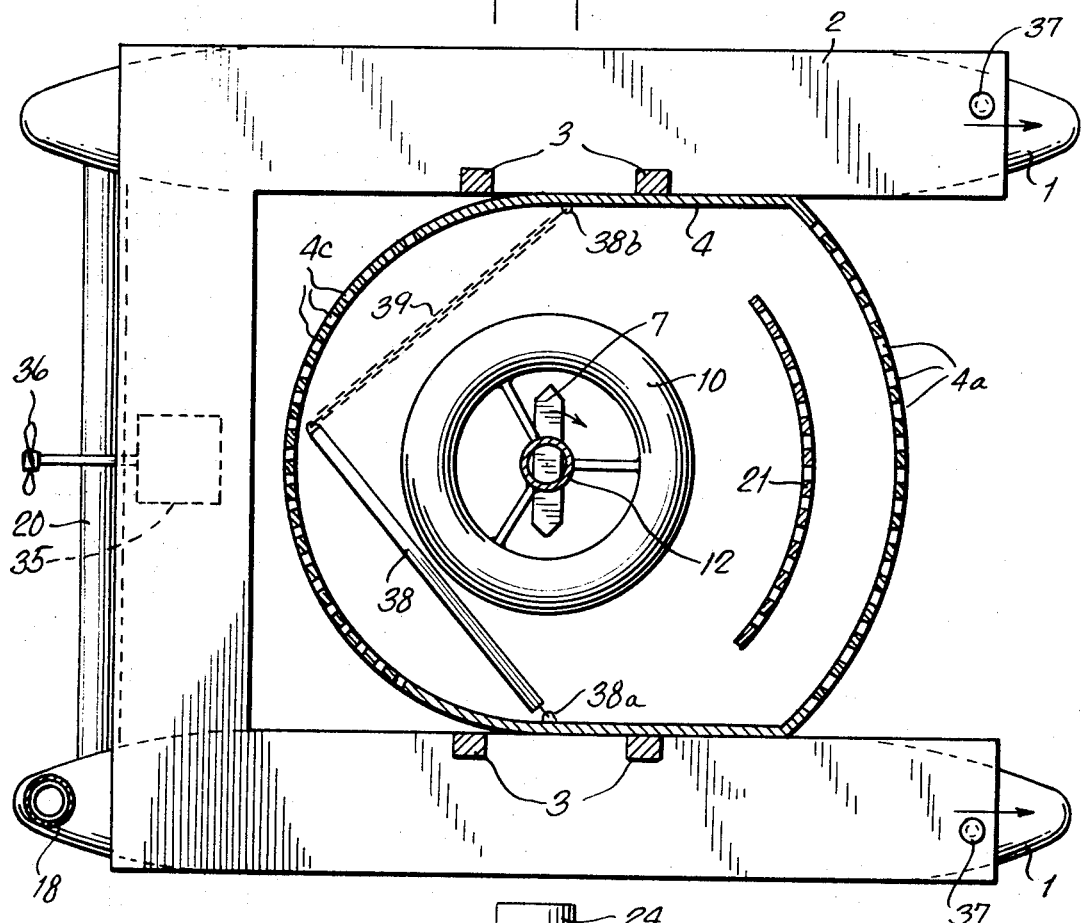
FIG. 3 is a sectional view of the vessel of FIG. 1, taken along the line 3—3 of FIG. 1.

The vessel in FIG. 1 includes twin hulls 1 connected by a deck 2, which is supported on the upper surface of the hulls. The deck 2 is generally U-shaped when viewed in plan, as best seen in FIG. 3. A bridge 3 connects the midpoints of the two longitudinal sides of the deck. The bridge 3 includes a horizontal beam 3a, which supports by means not shown, a vertical, generally cylindrical separator tank 4. The term vertical, generally cylindrical tank is intended to define a tank such as that shown in the drawings (see FIG. 3), in which the bow wall and the stern wall are vertical sections of cylinders, not necessarily of the same radius, and having vertical axes which are not necessarily coincident. The bow end of the tank, appearing at the right in FIG. 1, is provided with a multiplicity of perforations 4a, which serve as an inlet for the water through which the vessel is moving. To avoid excessive disturbance of the vortex by the motion of the vessel through the water, the openings created by the perforations must not exceed 50 percent of the total slotted area. Also, for greatest efficiency, the angle in a horizontal plane subtended by the arc of the total perforated area, when viewed from above, should be approximately 90°. Vertical slots may be used instead of perforations. Suitable propulsion means for the vessel may be provided, such as an engine 35, driving a propeller 36 (see FIG. 3). Alternatively, the vessel may be towed by means of stanchions 37.

Figure 4:
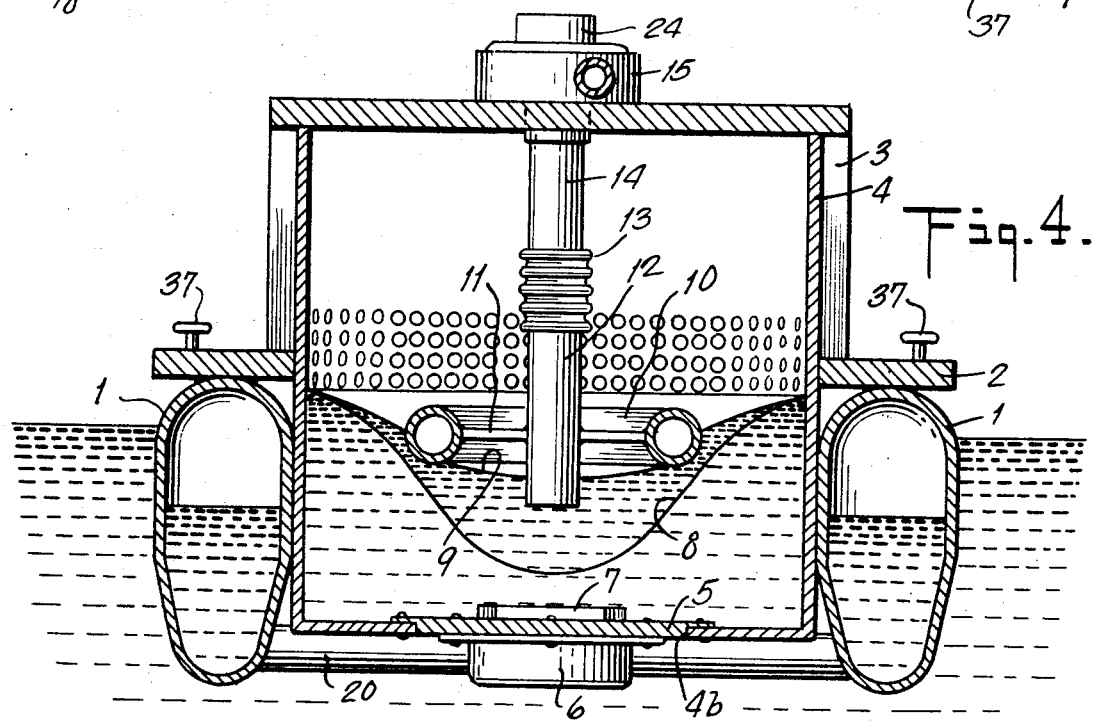
FIG. 4 is a sectional view taken along the line 4—4 of FIG. 1.

The openings 4a are arranged to extend both above and below the water level, so that variations in the draft of the vessel can be accommodated. Any liquid floating on the surface of the water is carried into the tank 4 by the motion of the vessel. The perforated front wall of the tank also serves as a trash grill to keep floating solid objects out of the tank 4. The bottom of the tank 4 is closed. The tank 4 may be made of magnetic material, e.g., steel. At the center of the bottom of the tank, there is provided an opening 4b, which is closed by a plate 5 of non-magnetic material. On the underside of the plate 5 is mounted a motor 6, which may be an electric motor is a suitable watertight housing. The motor 6 drives an impeller 7 mounted on the upper side of the plate 5 through a suitable magnetic coupling, to avoid the necessity of a rotating shaft with a packed seal at the bottom of the tank. The rotation of the impeller 7 creates a vortex in the surface of the liquid at the center of the tank. The oil-water surface is shown in FIG. 4 at 8 and the oil-air surface is shown at 9. Because of the difference in density of the oil and water, the thickness of the oil layer at the center of the tank is substantially greater than the thickness of the oil layer at the edges of the tank. Hence, there is formed a pool of oil having substantial depth at the center of the tank.

The speed of the impeller should be slow enough to prevent turbulence anywhere in the tank. A speed of two to three rotations per second has been found satisfactory. An impeller diameter between about one-fourth to about one-third of the tank diameter has also been found satisfactory.

A float 10 shown as having a toroidal contour is symmetrical about a vertical axis and is provided with spokes 11 connecting the toroidal part of the float to a conduit 12 which extends vertically along the axis of the float, and has its lower end submerged in the central pool of oil in the vortex. The upper end of the conduit 12 communicates with a flexible conduit section 13, shown as having a corrugated wall, which allows it to move freely through a limited distance in any lateral direction, so as to accommodate changes in the position of the vortex in the tank.

The corrugated section 13 is also vertically extendable, so as to accommodate changes in the liquid level in the tank with respect to the hulls 1. When the hulls 1 are being used for oil storage, as shown, the water line on the outside of the hull may vary considerably between the empty tank condition and the full tank condition. The expandable pipe 13 is provided to accommodate this situation, and allow the bottom inlet end of the pipe 12 to remain in the oil pool at the center of the vortex, regardless of how high or low the vessel is riding in the water.

The upper end of the corrugated conduit section 13 is connected to another rigid conduit 14, which leads to the inlet of a pump 15, which may be driven by an electric motor 24. The pump 15 has a discharge conduit 16 leading through a flexible hose 17 to an inlet 18 communicating with the interior of one of the hulls 1. Alternatively, conduit 16 may be connected by suitable valving (not shown) to a flexible oil storage bag which may be floating in the water. After the bag is filled with oil, it is sealed and either left for later pickup or towed along. A quantity of storage bags may be carried on board. The two hulls 1 are connected near their bottoms by a pipe 20 which maintains the oil levels in the two hulls substantially equal. Inside pipe 20, baffles (not shown) are provided which limit the rate of transfer of oil between hulls 1 during swells.

The stern end of the tank 4 is provided with a plurality of openings 4c, similar to those at the bow end 4a, which serve as water outlet openings. The openings 4c may be located both above and below the water line, as shown, or may be only below the water line, so that the stern wall of the tank then serves as a skimmer to prevent oil from escaping over the back side of the vortex. It has been found that for most oil slicks, which are not very thick (e.g., about 0.12 inch), it does not matter whether the outlet openings 4c extend above the water line. It is conceivable, however, that when operating with an oil layer of substantial depth, it may be desirable to have all the outlet openings 4c below the liquid level.

The stern side of the tank also serves as a trash grill to keep floating objects out of the tank.

A baffle 21, perforated in a manner similar to apertures 4a and 4c, of generally arcuate cross-section, extends vertically from the bottom of the tank, and is located inside the tank and aligned with the inlet apertures 4a. The purpose of the baffle 21 is to avoid excessive disturbance of the vortex by motion of the vessel through the water.

FIG. 5

This figure illustrates a modified contour of the float. The float 10 of FIGS. 3 and 4 is replaced in FIG. 5 by a spherical float 31a. The pipe section 12 extends through the vertical axis of the spherical float 31a and has its inlet opening at the bottom of the float.

FIGS. 6–7

These figures illustrate a modified form of impeller. Instead of being a simple bar impeller as shown at 7 in FIGS. 3 and 4, the impeller 22 of FIGS. 6 and 7 has a plurality of spiral blades extending outwardly from a central hub affixed to a shaft 23 which passes through a suitable sealed opening in the bottom of the tank 4, and is driven by an impeller motor 6.

FIG. 8

This figure illustrates an electrical circuit for energizing the impeller motor 6 and the pump motor 24. The source of energy is shown as a battery 25. The impeller motor may be started by closing a switch 26. After the switch 26 is closed, the pump motor may be started by closing a switch 27. Note that the pump motor cannot be started unless the impeller motor 6 is running, although the two can be started simultaneously. If desired, a suitable time delay can be added to switch 27, to make sure that the impeller comes up to a vortex-forming speed before the pump motor 24 is started.

In some cases it may be desirable to add a sensing device, such as a conductivity measuring device, at the inlet of the conduit 12, and connecting this sensing device to suitable apparatus for controlling the pump motor 24. The pump motor 24 may then be prevented from operating unless there is oil present at the inlet opening of the conduit 12.

While it is preferred to pump the oil into the hulls 1, as shown, or into the collapsible storage bags, as described, the oil may alternatively be pumped into a container carried by an adjacent barge or other craft.

The separator apparatus according to the invention substantially completely separates the oil from the water and delivers substantially pure oil to the storage tank. It is not contended that the oil so delivered is completely pure, but there is little or no water entrained with it, as compared with the prior art oil separating devices.

The efficiency of the separation process is further enhanced by the addition of a skimmer 38, shown in FIG. 3. The skimmer 38 consists of a wooden, plastic or hollow metal bar, anchored to the walls of the tank in a manner such as to float on the liquid surface. When there is very little oil in the tank, surface tension in the oil causes the oil to globulate on the surface instead of forming a continuous film. These globules might drift out of the tank through the water outlet 4c or circulate indefinitely unless prevented by skimmer 38 which deflects the globules, causing the oil to be drawn into the vortex. The efficiency of the process is thereby increased from approximately 93 percent without a skimmer to 99 percent with the addition of the skimmer.

As shown, the skimmer bar 38 is pivotally connected at one end 38a to the side of the tank where the liquid is moving toward the stern. The other end 38b is connected by a chain 39 to the other side of the tank. Both ends of the bar may be connected to accommodate variations in the draft of the vessel, for example, by means of chains, or otherwise.

Our separator apparatus is not limited in its utility to the separation of oil and water, but may be used to separate any two non-miscible liquids of different densities. It is not necessarily used on a vessel, nor is it necessarily used for removing oil slicks from the surface of the open sea. The tank 4 can be mounted on dry land and supplied with a combination of non-miscible liquids of different densities at its inlet side and would successfully separate the two liquids. It is necessary that the two liquids be non-miscible to the extent that they tend to separate by gravity when a mixture of them is allowed to stand.

Another significant difference of our apparatus as compared to prior apparatus is the fact that the heavier liquid (water) is never lifted above the sea. Also, other devices do not operate well in a realistic sea environment.

We claim:

1. Apparatus for separating two liquids of different densities from a mixture thereof, including:
   a. a vertical, generally cylindrical separator tank having an inlet in a side wall of the tank for said mixture of two liquids;
   b. lateral discharge outlet means for the heavier liquid in a side wall of the tank opposite the inlet and having sufficient capacity to maintain the liquid level below the top of the tank;
   c. an impeller at the center of the bottom of the tank;
   d. means for rotating said impeller to create a vortex at the surface of the liquid in the tank, said vortex being spaced vertically above the impeller;
   e. an outlet for the lighter of said two liquids having an opening submerged in the liquid at the center of the vortex, said outlet for the lighter liquid comprising:
      1. a float within the tank and having a contour symmetrical about a vertical axis and aligned with the axis of the impeller; and
      2. a conduit fixed to the float and extending along the vertical axis thereof and communicating with said submerged opening, said float being effective to centralize in the vortex the outlet for the lighter liquid.

2. Apparatus as in claim 1, in which:
   a. said conduit fixed to the float extends upwardly from said submerged opening;
   b. said outlet for the lighter liquid further comprises:
      1. a flexible conduit section connected to the upper end of the conduit fixed to the float; and
      2. a conduit fixed to the top of the tank and connected to the upper end of said flexible conduit.

3. Apparatus as defined in claim 1, in which said float has a toroidal contour.

4. Apparatus as defined in claim 1, in which said float has a spherical contour.

5. Apparatus for separating two liquids of different densities from a mixture thereof, including:
   a. a vertical, generally cylindrical separator tank having an inlet in a side wall of the tank for said mixture of two liquids;
   b. lateral discharge outlet means for the heavier liquid in a side wall of the tank opposite the inlet and having sufficient capacity to maintain the liquid level below the top of the tank;
   c. an impeller at the center of the bottom of the tank;
   d. means for rotating said impeller to create a vortex at the surface of the liquid in the tank, said vortex being spaced vertically above the impeller;
   e. an outlet for the lighter of said two liquids having an opening submerged in the liquid at the center of the vortex; and
   f. skimmer means floating on the liquid between the vortex and the lateral discharge outlet means, and effective to deflect floating masses of the lighter liquid away from the lateral discharge outlet means and toward the 6. A vessel for for skimming a light, non-water-miscible liquid from a surface of a body of water, including:
   a. hull means;
   b. propulsion means for advancing the hull means through the body of water;
   c. a vertical cylindrical separator tank supported by said hull means and extending above and below the water level, said tank including:
      1. an inlet at the bow end of the tank and extending above and below the water level;
      2. an outlet at the stern end of the tank and at least partly below the water level;
      3. means for creating a vortex at the surface of the liquid in said tank;
      4. light liquid outlet means having an opening submerged in the liquid at the center of said vortex;
   d. a pump connected to said light liquid outlet means;
   e. a motor for driving said pump; and
   f. sensing means located at the opening of said light liquid outlet means and effective to distinguish between said light liquid and water; and
   g. means controlled by said sensing means preventing energization of the motor unless the light liquid is present at the outlet opening.

7. A vessel for skimming a light, non-water-miscible liquid from a surface of a body of water, including:
   a. hull means;
   b. propulsion means for advancing the hull means through the body of water;
   c. a vertical, generally cylindrical separator tank supported by said hull means and extending above and below the water level, said tank including:
      1. an inlet in the bow wall of the tank and extending above and below the water level;
      2. an outlet in the stern wall of the tank and at least partly below the water level;
      3. means for creating a vortex at the surface of the liquid in said tank;
      4. light liquid outlet means having an opening submerged in the liquid at the center of said vortex; and
   d. skimmer means floating on the liquid between the vortex and the stern outlet and effective to deflect floating masses of the lighter liquid away from the stern outlet and toward the vortex.

8. A vessel for skimming a lighter-than-water, non-water-miscible liquid from a surface of a body of water, including:
   a. hull means;
   b. propulsion means for advancing the hull means through the body of water;
   c. a vertical generally cylindrical separator tank supported by said hull means and extending above and below the water level, said tank including:
      1. a vertically extending bow wall of part-cylindrical form having inlet openings therein both above and below the water level through which openings water and a lighter liquid floating thereon may enter the tank without substantial change in level;
      2. a vertically extending stern wall of part-cylindrical form having a different radius of curvature than the bow wall, said stern wall having outlet openings therein, said outlet openings being at least partly below the water level, through which outlet openings water may flow from the tank without substantial change in level;
      3. means within the tank and spaced from the bow and stern walls for creating a vortex at the surface of the liquid in said tank;

4. outlet means for the lighter liquid only having an opening submerged in the liquid at the center of said vortex.

9. A vessel as in claim 8, in which said bow and stern walls have a common vertical axis, and including:
   a. an impeller in said vortex creating means rotatable about said axis; and
   b. a baffle within the tank and concentric with said axis, said baffle being aligned with said inlet openings and the vortex creating means, and effective to shield the vortex from disturbance by liquid entering the tank.

* * * * *